(12) United States Patent
Hiji et al.

(10) Patent No.: US 8,031,392 B2
(45) Date of Patent: Oct. 4, 2011

(54) DISPLAY DEVICE

(75) Inventors: Naoki Hiji, Minamiashigara (JP);
Yoshinori Machida, Minamiashigara (JP); Masaaki Abe, Minamiashigara (JP); Ryota Mizutani, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 12/784,279

(22) Filed: May 20, 2010

(65) Prior Publication Data
US 2011/0134506 A1 Jun. 9, 2011

(30) Foreign Application Priority Data

Dec. 9, 2009 (JP) ................................ 2009-279731

(51) Int. Cl.
*G02B 26/00* (2006.01)
*G09G 3/34* (2006.01)
*G03G 17/04* (2006.01)
(52) U.S. Cl. ........................ 359/296; 345/107; 430/32
(58) Field of Classification Search .................. 359/296; 430/31–32; 345/107; 349/33
See application file for complete search history.

(56) References Cited

U.S. PATENT DOCUMENTS

| 5,622,804 | A | 4/1997 | Matsuoka et al. |
| 5,723,250 | A | 3/1998 | Matsuoka et al. |
| 6,639,580 | B1 * | 10/2003 | Kishi et al. ..................... 345/107 |
| 2006/0077171 | A1 * | 4/2006 | May et al. ..................... 345/107 |
| 2006/0209009 | A1 | 9/2006 | Schlangen et al. |
| 2007/0222745 | A1 | 9/2007 | Kawai |
| 2007/0268245 | A1 * | 11/2007 | Sugita et al. .................. 345/107 |

FOREIGN PATENT DOCUMENTS

| JP | 7-325434 A | 12/1995 |
| JP | 2006-522361 A | 9/2006 |
| JP | 2006-343458 A | 12/2006 |
| JP | 2007-256495 A | 10/2007 |
| JP | 2008-116512 A | 5/2008 |
| JP | 2009-192637 A | 8/2009 |

\* cited by examiner

*Primary Examiner* — Dawayne Pinkney
(74) *Attorney, Agent, or Firm* — Sughrue Mion, PLLC

(57) ABSTRACT

There is provided a display device including: an electrophoretic display element including, plural types of particles, each of the respective plural types of particles being charged with the same polarity, differing in optical properties, and differing in either in migration speed and/or electric field threshold value for moving, a translucent display-side electrode, a first back-side electrode, and a second back-side electrode; and a voltage control section that controls the voltages applied to the display-side electrode, the first back-side electrode, and the second back-side electrode, such that the types of particles having the fastest migration speed from the plural types of particles, or the types of particles having the lowest threshold value from the plural types of particles, are moved to the first back-side electrode or to the second back-side electrode, and then the particles that moved to the first back-side electrode are moved to the display-side electrode.

6 Claims, 4 Drawing Sheets

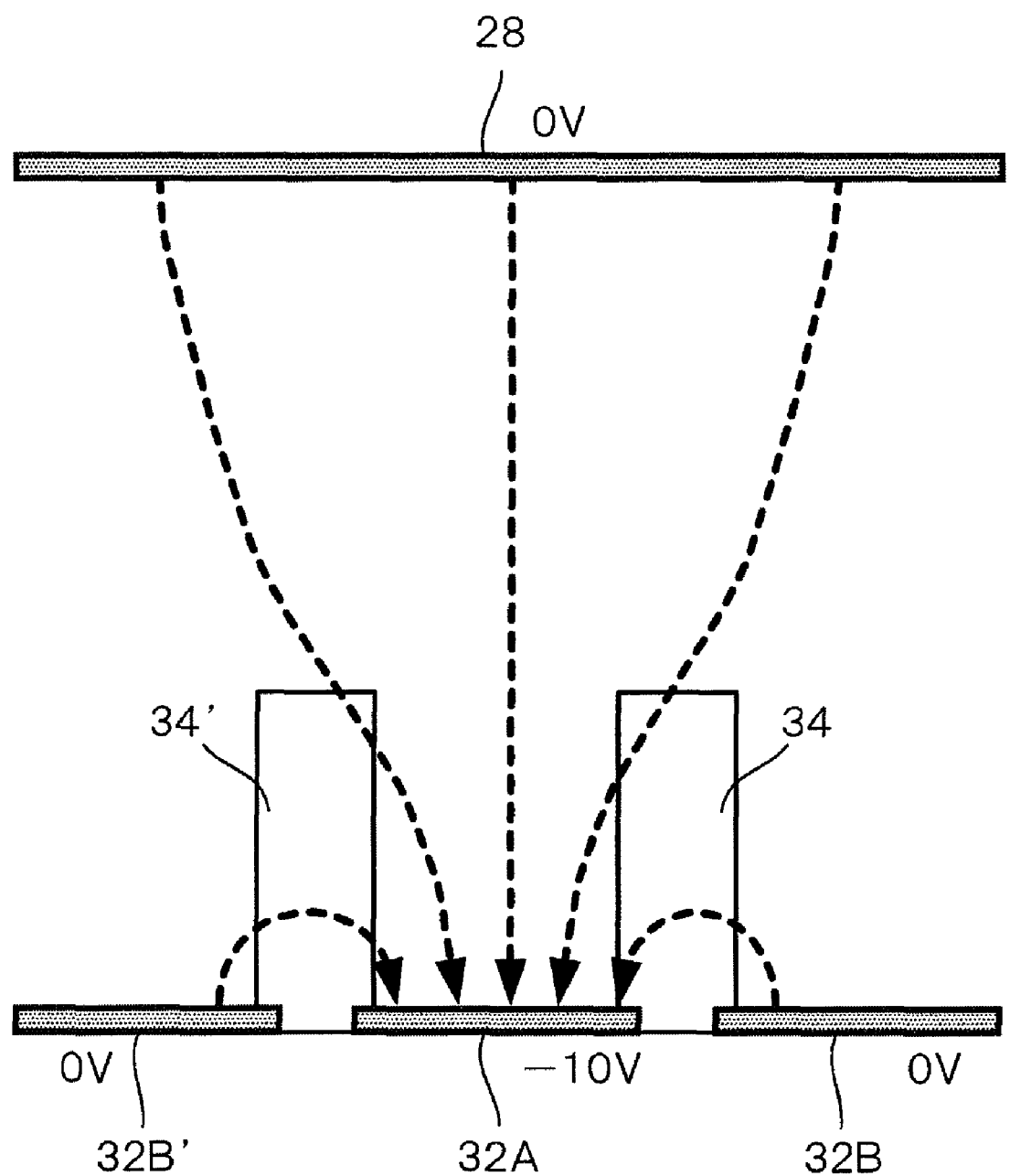

DISPLAY DEVICE

CROSS-REFERENCE TO RELATED APPLICATION

This application claims priority under 35 USC 119 from Japanese Patent Application No. 2009-279731 filed on Dec. 9, 2009.

BACKGROUND

1. Technical Field

The present invention relates to a display device.

2. Related Art

Various technologies are proposed for performing black and white display, or color display, using an electrophoretic display element with electrophoretic particles enclosed between a pair of electrodes, with at least one of the electrodes being translucent.

SUMMARY

According to the present invention, there is provided a display device including:

an electrophoretic display element including, plural types of particles enclosed between a pair of substrates, at least one of the substrates being translucent and each of the respective plural types of particles being charged with the same polarity, differing in optical properties, and differing in either migration speed and/or electric field threshold value for moving, a translucent display-side electrode provided at the substrate side where the translucent substrate is disposed, a first back-side electrode provided at the side of the other substrate, facing the display-side electrode, and a second back-side electrode provided at the side of the other substrate, facing the display-side electrode; and a voltage control section that controls the voltages applied to the display-side electrode, the first back-side electrode, and the second back-side electrode, such that the types of particles having the fastest migration speed from the plural types of particles, or the types of particles having the lowest threshold value from the plural types of particles, are moved, in sequence by each of the different types of particles, to the first back-side electrode or to the second back-side electrode, and then the particles that moved to the first back-side electrode are moved to the display-side electrode.

BRIEF DESCRIPTION OF THE DRAWINGS

Exemplary embodiments of the present invention will be described in detail based on the following figures, wherein:

FIG. 4 is a diagram showing an example of lines of electrical force when a voltage is applied to a back-side electrode.

DETAILED DESCRIPTION

Detailed explanation follows of an exemplary embodiment of the present invention, with reference to the drawings.

Figure 1:
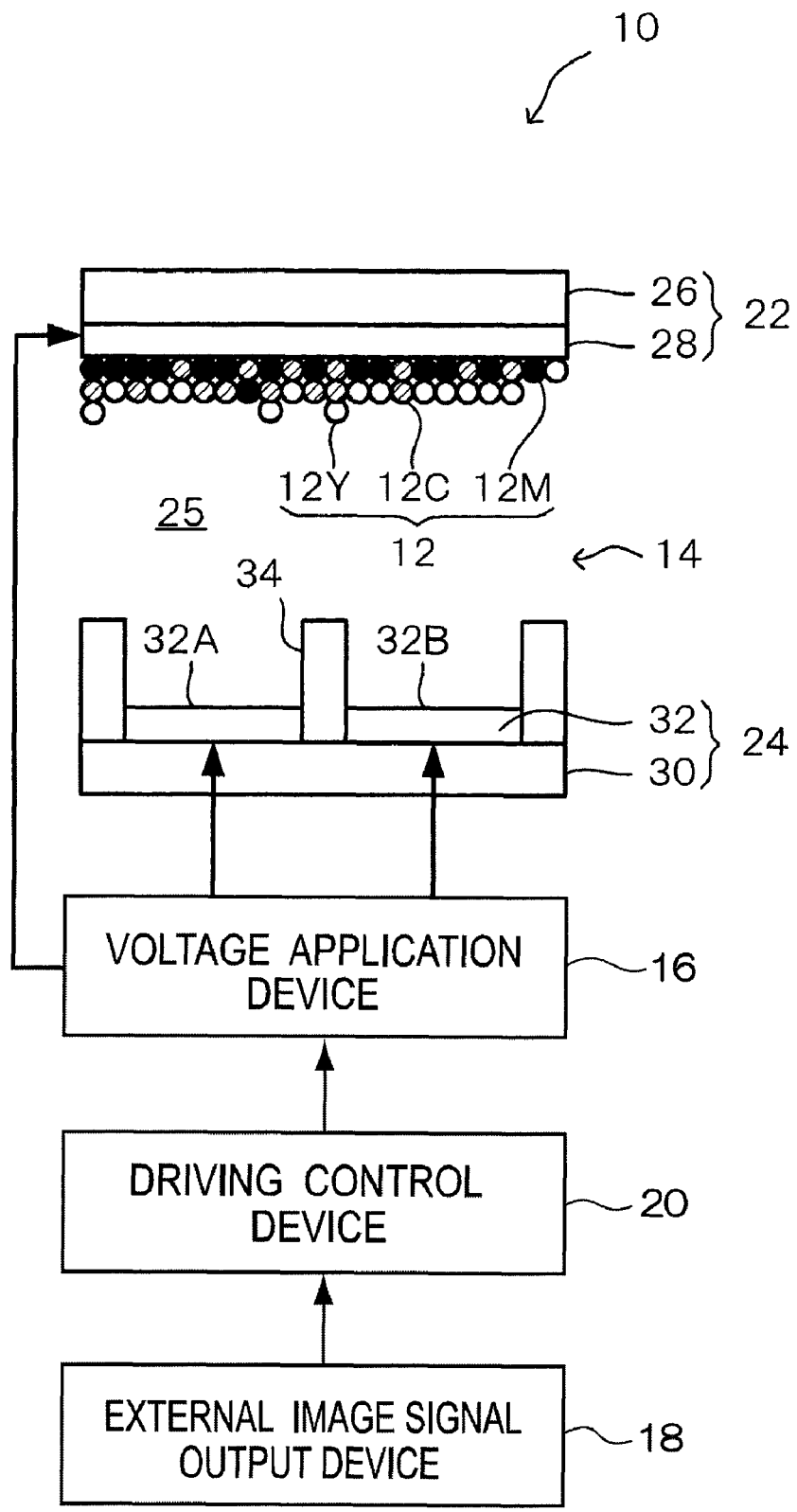
FIG. 1 is a diagram schematically showing a display device according to an exemplary embodiment of the present invention.

FIG. 1 is a diagram schematically showing a display device according to an exemplary embodiment of the present invention.

A display device 10 according to an exemplary embodiment of the present invention is configured including: an electrophoretic display element 14 that displays an image by moving plural types of electrophoretic particles 12 (12C, 12M, 12Y); a voltage application device 16 that applies a voltage to the electrophoretic display element 14 in order to display an image; and a driving control device 20 that receives image display instructions from an external image signal output device 18, such as, for example, a personal computer or the like, and controls driving of the voltage application device 16.

The electrophoretic display element 14 is configured including a translucent display substrate 22 as an image display surface, and a back substrate 24 that is disposed facing the display substrate 22 and separated therefrom by a predetermined distance.

A dispersion liquid 25 that includes plural types of colored electrophoretic particles 12 is enclosed between the display substrate 22 and the back substrate 24. In the present exemplary embodiment the plural types of electrophoretic particles are three types of the electrophoretic particles 12, these being magenta colored electrophoretic particles 12M, cyan colored electrophoretic particles 12C, and yellow colored electrophoretic particles 12Y. Each of the types of electrophoretic particles 12 moves according to the intensity of an electric field formed between the substrates. When given electrophoretic particles 12 move to the display substrate 22 side then that color is displayed, and colorant(s), such as, for example, dyes, pigments, and/or colored particles or the like are added to the dispersion liquid 25 in order to conceal the electrophoretic particles 12 when they have moved to the back substrate 24 side. As such pigments and colored particles, preferably pigment and colored particles with low mobility are employed, such that their movement can be ignored in practice when a voltage is applied to move the electrophoretic particles 12. There are no particular limitations to the colors of the above colorants as long as a contrast can be obtained to the color of the electrophoretic particles 12 and, for example, black or white can be employed.

Each of electrophoretic particles 12 in the present exemplary embodiment is charged with the same polarity, being positively charged in the present exemplary embodiment. The migration speed for each type is a different speed. In the present exemplary embodiment the sequence of the migration speeds is set such that the migration speed of the magenta colored electrophoretic particles 12M is the highest, the migration speed of the cyan colored electrophoretic particles 12C is the next highest, followed by the yellow colored electrophoretic particles 12Y. Note that the migration speed can be set by controlling, for example, the particle size, amount of charge, and the like.

Figure 2:
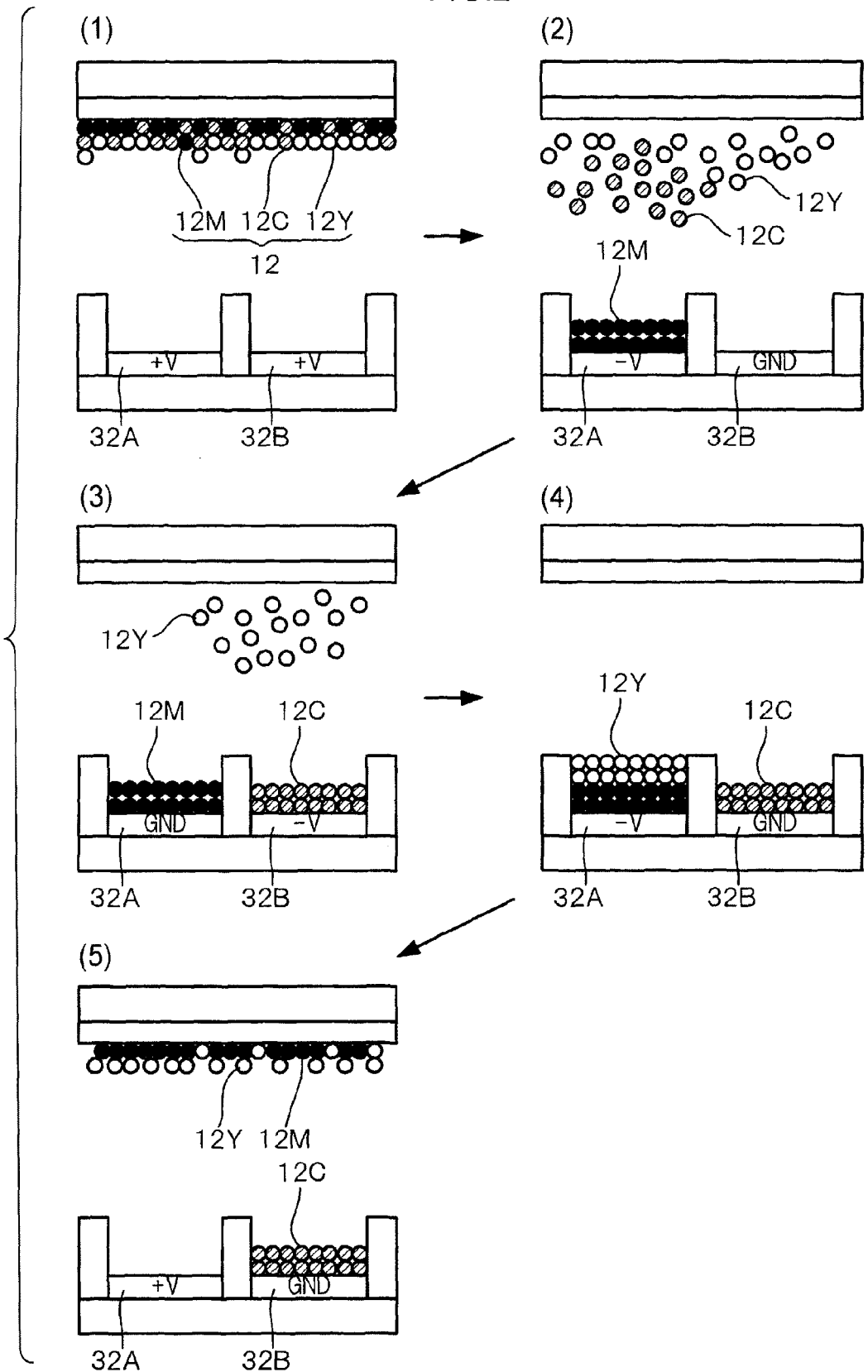
FIG. 2 is a diagram for explaining a display method when displaying red with a display device according to an exemplary embodiment of the present invention.

The display substrate 22 has a display-side electrode 28 provided on a support substrate 26, and the back substrate 24 has plural (two in the present exemplary embodiment) back-side electrodes 32 provided on a support substrate 30 so as to face the display-side electrode 28. In the present exemplary embodiment, a first back-side electrode 32A holds the electrophoretic particles 12 having optical properties of the color for display, and the other back-side electrode 32B holds the electrophoretic particles 12 having optical properties of colors other than the color for display. The length from one end of the back-side electrode 32A furthest from the back-side electrode 32B to the opposite end on the back-side electrode 32B is preferably ½ to 5 times the separation distance between the display substrate 22 and the support substrate 30. When smaller than this range, when, as described below, the electrophoretic particles 12 contributing to the color for display have moved to the display substrate 22 side, as shown in FIG. 2 (5), the electrophoretic particles 12 do not spread out evenly on the display substrate 22, resulting in insufficient coloration. However, when the separation distance is greater than the above range, since the electric field intensity between the back-side electrode 32A and the back-side electrode 32B is significantly more intense than the electric field intensity between the back-side electrode 32B and the display-side electrode 28, it is difficult to move the electrophoretic particles 12 that contribute to the color for display to the display substrate 22 side.

Materials such as, for example, glass and plastics can be employed for the above support substrates 26 and 30. Examples of such plastics include polycarbonate resins, acrylic resins, polyimide resins, polyester resins, epoxy resins, polyethersulfone resins, and the like.

Materials that can be used for the display-side electrode 28 and the back-side electrodes 32 include: oxides, such as, for example, oxides of indium, tin, cadmium, and antimony; multiple oxides, such as, for example, ITO; metals, such as, for example, gold, silver, copper, and nickel; and organic materials, such as, for example, polypyrrole, and polythiophene. These may be formed into a single layer film or composite film, or as a composite film formed with, for example, a vacuum deposition method, a sputtering method, a coating method, or the like.

Note that the display-side electrode 28 may be embedded in the support substrate 26, and, in a similar manner, the back-side electrodes 32 may be embedded in the support substrate 30. In such cases, since the materials of the electrodes 28, 30 sometimes affect the electrical properties and mobility of each type of the electrophoretic particles 12, selection of the materials needs to be made according to, for example, the composition and the like of each type of the electrophoretic particles 12.

Furthermore, the display-side electrode 28 and the back-side electrodes 32 may be disposed respectively separated from the display substrate 22 and the back substrate 24, and externally to the electrophoretic display element 14. Explanation is given in the present exemplary embodiment of electrodes being provided to both the display substrate 22 and the back substrate 24 (the display-side electrode 28 and the back-side electrodes 32), however electrodes may be provided only to one or other of the display substrate 22 or the back substrate 24.

The dispersion liquid 25 in which the electrophoretic particles 12 are dispersed is preferably a high resistance liquid. "High resistance" here means that the volume resistivity is $10^7$ Ωcm or greater, preferably $10^{10}$ Ωcm or greater, and more preferably $10^{12}$ Ωcm or greater.

Specific examples of liquids preferably used as a high resistance liquid include: saturated hydrocarbon compounds such as, for example, hexane, cyclohexane, decane, hexadecane, kerosene, paraffin, isoparaffin, benzine, high grade petroleum, and the like; aromatic hydrocarbon compounds such as, for example, toluene, xylene, diisopropylnaphthalene, and the like; halogenated hydrocarbon compounds such as, for example, dichloroethylene, trichloroethylene, perchloroethylene, trichlorotrifluoroethane, tetrachloroethane, dibromotetrafluoroethane, and the like; silicone oils, olive oils, and the like; and mixtures thereof.

Note that acids, alkalis, salts, dispersion stabilizers, stabilizers for purposes such as anti-oxidation and ultraviolet absorption, antibacterial agents, preservatives, and the like can be added, as required, to the high resistance liquid. However, additions are preferably made such that the volume resistance value falls within the specific range shown above.

Moreover, for example, anionic surfactants, cationic surfactants, amphoteric surfactants, nonionic surfactants, fluorochemical surfactants, silicone based surfactants, metallic soaps, alkyl phosphoric acid esters, succinimides, and the like, can be added to the high resistance liquid as charge control agents.

More specific examples of such ionic and nonionic surfactants include the following. Nonionic surfactants include, for example, polyoxyethylene nonylphenyl ether, polyoxyethylene octylphenyl ether, polyoxyethylene dodecylphenyl ether, polyoxyethylene alkyl ether, polyoxyethylene fatty acid esters, sorbitan fatty acid esters, polyoxyethylene sorbitan fatty acid esters, fatty acid alkylol amides, and the like. Anionic surfactants include, for example, alkylbenzene sulfonates, alkylphenyl sulfonates, alkyl naphthalenesulfonates, higher fatty acid salts, sulfuric ester salts of higher fatty acid esters, sulfonates of higher fatty acid esters, and the like. Cationic surfactants include, for example, primary, secondary and tertiary amine salts, quaternary ammonium salts and the like. Such charge control materials are preferably contained at 0.01% by weight to 20% by weight, with respect to the particle solid content, with a range of 0.05% by weight to 10% by weight being preferable. When the amount of these charge control materials is less than 0.01% by weight then the desired charge control effect is insufficient, and if 20% by weight is exceeded then an excessive rise occurs in the electric conductivity of the dispersion liquid.

Examples of each type of the electrophoretic particles 12 for dispersion in the dispersion liquid 25 include: glass beads; metallic oxide particles, such as alumina, titanium oxide, and the like; thermoplastic or thermosetting resin particles; such resin particles with a colorant adhered to the surface thereof; particles of thermoplastic or thermosetting resin containing a colorant therein; metal colloid particles that exhibit surface plasmon resonance; and the like.

Examples of thermoplastic resins that can be employed in the preparation of the particles include, for example, homopolymers and copolymers of: styrenes, such as, for example, styrene and chlorostyrene; monoolefins such as, for example, ethylene, propylene, butylene and isoprene; vinyl esters such as, for example, vinyl acetate, vinyl propionate, vinyl benzoate and vinyl butyrate; esters of α-methylene aliphatic monocarboxylic acid, such as, for example, methyl acrylate, ethyl acrylate, butyl acrylate, dodecyl acrylate, octyl acrylate, phenyl acrylate, methyl methacrylate, ethyl methacrylate, butyl methacrylate, dodecyl methacrylate; vinyl ethers, such as, for example, vinylmethyl ether, vinylethyl ether, and vinylbutyl ether; vinyl ketones, such as, for example, vinyl methyl ketone, vinyl hexyl ketone, and vinyl isopropenyl ketone; and the like.

Examples of thermosetting resins that can be employed in the preparation of the particles include: cross-linking resins, such as, for example, cross-linking copolymers which use divinylbenzene as a principal component, and cross-linking polymethylmethacrylate; phenol resins; urea resins; melamine resins; polyester resins; silicone resins; and the like. In particular, typical binder resins that can be used include polystyrene, styrene-alkyl acrylate copolymers, styrene-alkyl methacrylate copolymers, styrene-acrylonitrile copolymers, styrene-butadiene copolymers, styrene-maleic anhydride copolymers, polyethylene, polypropylene, polyesters, polyurethanes, epoxy resins, silicone resins, polyamides, modified rosins, paraffin waxes, and the like.

Organic and inorganic pigments and oil soluble dyes can be used as colorants. Typical examples thereof include: magnetic powders, such as, for example, magnetite and ferrite; carbon black; titanium oxide; magnesium oxide; zinc oxide; copper phthalocyanine cyan coloring materials; azo yellow coloring materials, azo magenta coloring materials; quinacridone magenta coloring materials; well known colorants for red color materials, green color materials, and blue color materials; and the like. Specifically, the following are typical examples that can be used: aniline blue, chalco oil blue, chrome yellow, ultra marine blue, DuPont oil red, quinoline yellow, methylene blue chloride, phthalocyanine blue, malachite green oxalate, lamp black, rose bengal, C.I. pigment red 48:1, C.I. pigment red 122, C.I. pigment red 57:1, C.I. pigment yellow 97, C.I. pigment blue 15:1, C.I. pigment blue 15:3 and the like.

Charge control agents may be mixed into particle resins, as required. Well known electrophotographic toner materials can be used as such charge control agents. These include, for example: quaternary ammonium salts and salicylic acid metal complexes, such as, for example, cetylpyridinium chloride, BONTRON P-51, BONTRON P-53, BONTRON E-84, BONTRON E-81 (trade names; made by Orient Chemical Industries, Ltd.,) and the like; phenol condensates, tetraphenyl compounds, metal oxide particles, and metal oxide particles to which surface treatment has been carried out with various coupling agents; and the like.

External additives may, as required, be adhered to the surface of the particles. Regarding the color of such external additives, transparent external additives are preferable so as not to affect the color of the particles. As such external additives, inorganic particles may be used, such as, for example, silicon oxide (silica), metal oxides, such as, for example, titanium oxide, alumina, and the like. Surface treatment may be carried out to the particles with a coupling agent or silicone oil in order to adjust the electrostatic properties of the particles, their flowability, their environment dependency, and the like. Examples of such coupling agents include: agents for positive triboelectric charging, such as, for example, aminosilane coupling agents, amino titanium coupling agents, and nitrile coupling agents; agents for negative triboelectric charging, such as, for example, acrylic silane coupling agents, titanium coupling agents, epoxysilane coupling agents, and silane coupling agents which do not contain a nitrogen atom (configured of atoms other than nitrogen). Furthermore, the following are examples of silicone oils: those with positive triboelectric charging, such as, for example, amino modified silicone oils, and the like; and those with negative triboelectric charging, such as, for example, dimethyl silicone oils, alkyl modified silicone oils, α-methylsulfone modified silicone oils, methylphenyl silicone oils, chlorophenyl silicone oils, and fluorine modified silicone oils, and the like.

Conventionally known methods may be employed as a method for producing each type of the electrophoretic particles 12. For example, as described in Japanese Patent Application Laid-Open (JP-A) No. 7-325434, a method can be used in which: resin(s), pigment(s), and charge control agent(s) are measured out to the predetermined mixing ratio; the pigment(s) are added after heating and melting the resin(s), and mixed and dispersed therein; then, after cooling, particles are prepared by using a pulverizer, such as, for example, a jet mill, a hammer mill, a turbo mill, or the like; and the obtained particles are then dispersed in a dispersion medium. Moreover, particles may be prepared that contain charging control agent(s) in the particles, by polymerizing methods, such as, for example, suspension polymerization, emulsion polymerization, and dispersion polymerization, and with coacervation, melt dispersion, and emulsion aggregation methods, and these particles may then be dispersed in a dispersion medium, and a particle dispersion medium prepared. Furthermore, there is a method that may be used with a resin that is able to be plasticized, a dispersion medium that does not boil, wherein, using an appropriate device, raw materials of the resin, a colorant, a charging control agent, and a dispersion medium can be dispersed and kneaded at a temperature that is lower than the decomposition temperatures of the resin, the charging control agent, and/or the colorant. Specifically, particles can be prepared by heating and melting the resin and the charging control agent in a dispersion medium together with a pigment using a planetary type mixer, a kneader, or the like, then using the temperature dependency of the solvent solubility of the resin, the molten mixture may be cooled while stirring, and particle prepared by coagulation/precipitation therefrom.

In the present exemplary embodiment, as described above, the plural back-side electrodes 32 are provided on the back substrate 24 side, with the electrophoretic particles 12 having optical properties of the color for display held on the first back-side electrode 32A, and the electrophoretic particles 12 having optical properties of colors other than the color for display held on the other back-side electrode 32B. However, it is conceivable that when the respective electrophoretic particles 12 move to each of the back-side electrodes 32, electrophoretic particles 12 also move between the back-side electrodes 32.

In order to address this issue, a partitioning wall 34 is provided between the back-side electrodes 32 in the present exemplary embodiment. The partitioning wall 34 is lower than the separation distance between the substrates, and movement of the electrophoretic particles 12 between the back-side electrodes 32 is prevented by the partitioning wall 34.

The voltage application device 16 is connected to the display-side electrode 28 and the back-side electrodes 32, respectively, and an electric field is formed between the substrates by using the voltage application device 16 to apply a voltage between the display-side electrode 28 and the back-side electrodes 32.

The voltage application device 16 is connected to the driving control device 20, and the image signal output device 18 is connected to the driving control device 20. The driving control device 20 is configured equipped with, for example, a CPU, ROM, RAM, a hard disk, and the like, and the CPU performs image display on the display device 10 according to a program stored, for example, on the ROM, the hard disk, or the like. The image signal output device 18 may, for example, employ a hard disk or the like, to store and output display images to be displayed as images on the electrophoretic display element 14. Namely, the driving control device 20 controls the voltage application device 16 according to the display images stored on the image signal output device 18, and by applying voltages between the substrates, each of the types of the electrophoretic particles 12 moves according to the voltages, and an image is displayed. Note that the display images stored on the image signal output device 18 may be imported into the image signal output device 18 from various types of storage medium, such as, for example, a CD-ROM, a DVD, or the like, or via the internet.

Note that even after voltage application between the substrates has ceased, each type of the electrophoretic particles 12 is retained in the state it was in when the voltage was applied due to adhesion force such as, for example, Van der Waals forces, image force, or the like.

Explanation follows regarding the display of color on the display device 10 according to the exemplary embodiment of the present invention configured as described above.

In the present exemplary embodiment, as described above, the two back-side electrodes 32A, 32B are provided for the single display-side electrode 28, and each type of the electrophoretic particles 12 is charged with the same polarity, but they have differing respective migration speeds.

The voltages applied to the back-side electrodes 32 are controlled according to the color for display, such that the electrophoretic particles 12 are moved to the back-side electrode 32A or the back-side electrode 32B, in sequence by their migration speeds from the fastest. When this is carried out, the voltage applied to each of the back-side electrodes 32 is controlled such that the electrophoretic particles 12 having optical properties of the color for display move to the first back-side electrode 32A, and the electrophoretic particles 12 having optical properties of colors other than the color for display move to the other back-side electrode 32B. By so doing, the electrophoretic particles 12 having optical properties of colors for display are moved to the first back-side electrode 32A, and the electrophoretic particles 12 having optical properties of the color other than the colors for display are moved to the second back-side electrode 32B.

More precisely, first an initial state is achieved by grounding the display-side electrode 28, and then applying a positive voltage to each of the back-side electrodes 32 and moving each type of the electrophoretic particles 12 to the display substrate 22 side. Namely, since each type of the electrophoretic particles 12 is positively charged, each type of the electrophoretic particles 12 is moved towards the display-side electrode 28 side by application of a positive voltage to the back-side electrodes 32.

Next, the voltages applied to the back-side electrodes 32A, 32B are controlled, according to the color for display, in sequence from the electrophoretic particles 12 with the fastest migration speed. For example, when the electrophoretic particles 12 to be moved are the electrophoretic particles 12 having optical properties of the color for display, a negative voltage is applied to the back-side electrode 32A, and the back-side electrode 32B is grounded. However, when the electrophoretic particles 12 to be moved are the electrophoretic particles 12 having optical properties of colors other than the color for display, the back-side electrode 32A is grounded, and a negative voltage is applied to the back-side electrode 32B.

By so doing, the electrophoretic particles 12 having optical properties of colors for display are held on the first back-side electrode 32A, and the electrophoretic particles 12 having optical properties of the color other than the colors for display are held on the second back-side electrode 32B. Namely, by moving the electrophoretic particles 12 in sequence from the fastest migration speed, each type of the electrophoretic particles 12 are moved to the back-side electrode 32A or the back-side electrode 32B, according to the color for display.

Then, when all of the types of electrophoretic particles 12 have been moved to the back-side electrode 32A or the back-side electrode 32B, by applying a positive voltage to the back-side electrode 32A holding the electrophoretic particles 12 having optical properties of the color for display, and by grounding the second back-side electrode 32B, the electrophoretic particles 12 having optical properties of the color for display are moved from the back-side electrodes 32 to the display substrate 22 side, and the desired color is displayed.

Explanation follows, as an example, of a case in the present exemplary embodiment where red is displayed, this being a subtraction method color mix of magenta and yellow. FIG. 2 is a diagram for explaining a display method when displaying red with the display device 10 according to an exemplary embodiment of the present invention.

In the display device 10 according to the present exemplary embodiment, a reset state is first achieved by grounding the display-side electrode 28 and applying a +V voltage to each of the back-side electrodes 32. Due thereto, each type of the electrophoretic particles 12 is moved towards the display substrate 22 side, to give the state shown in FIG. 2 (1).

Then, since the magenta colored electrophoretic particles 12M, having the fastest migration speed, are of a color that contributes to the color for display, a −V voltage is applied to the back-side electrode 32A to which the electrophoretic particles 12 having optical properties of the color for display are to be moved, and the back-side electrode 32B, to which the electrophoretic particles 12 having optical properties of colors other than the color for display are to be moved, is grounded. The magenta colored electrophoretic particles 12M are thereby moved to the back-side electrode 32A, and the state shown in FIG. 2 (2) is arrived at.

Then, since the cyan colored electrophoretic particles 12C having the next fastest migration speed are of a color that does not contribute to the color for display, when the magenta colored electrophoretic particles 12M have been moved to the back-side electrode 32A, a −V voltage is applied to the back-side electrode 32B, to which the electrophoretic particles 12 having optical properties of colors other than the color for display are to be moved, and the back-side electrode 32A, to which the electrophoretic particles 12 having optical properties of the color for display are to be moved, is grounded. The cyan colored electrophoretic particles 12C are thereby moved to the back-side electrode 32B, and the state shown in FIG. 2 (3) is arrived at.

Then, since the yellow colored electrophoretic particles 12Y having the next fastest migration speed are of a color that contributes to the color for display, when the cyan colored electrophoretic particles 12C have been moved to the back-side electrode 32B, a −V voltage is applied to the back-side electrode 32A to which the electrophoresis particles 12 having optical properties of colors for display are to be moved, and the back-side electrode 32B, to which the electrophoresis particles 12 having the optical properties of the color other than the colors for display are to be moved, is grounded. The yellow colored electrophoretic particles 12Y are thereby moved to the back-side electrode 32A, and the state shown in FIG. 2 (4) is arrived at.

Then, by applying a +V voltage to the back-side electrode 32A, to which the electrophoretic particles 12 having optical properties of the color for display are to be moved, and by grounding the back-side electrode 32B, to which the electrophoretic particles 12 having optical properties of colors other than the color for display are to be moved, the magenta colored electrophoretic particles 12M and the yellow colored electrophoretic particles 12Y, these being colors that contribute to the color for display, are moved towards the display substrate 22 side. Red, which is a subtraction method mixed color of magenta and yellow, is thereby displayed.

An intermediate tone may be displayed by applying a −V voltage to the back-side electrode 32B prior to complete storage of one or more of the types of the electrophoretic particles 12 having optical properties of the color for display on the back-side electrode 32A. Or, an intermediate tone may be displayed by applying a −V voltage to the back-side electrode 32A prior to complete storage of the electrophoretic particles 12 having optical properties of colors other than the color for display on the back-side electrode 32B.

However, there might be some concern of movement of the electrophoretic particles 12 between the back-side electrodes 32A, 32B when the voltages applied to the back-side electrodes 32A, 32B are controlled in such a manner. Namely, concern that the electrophoretic particles 12 having optical properties of colors other than the color for display move to the back-side electrode 32A, to which only the electrophoretic particles 12 having optical properties of the color for display are to be moved, or that the electrophoretic particles 12 having optical properties of the color for display move to the back-side electrode 32B, to which the electrophoretic particles 12 having optical properties of colors other than the color for display are to be moved, resulting in a color mixing occurring.

Figure 3:
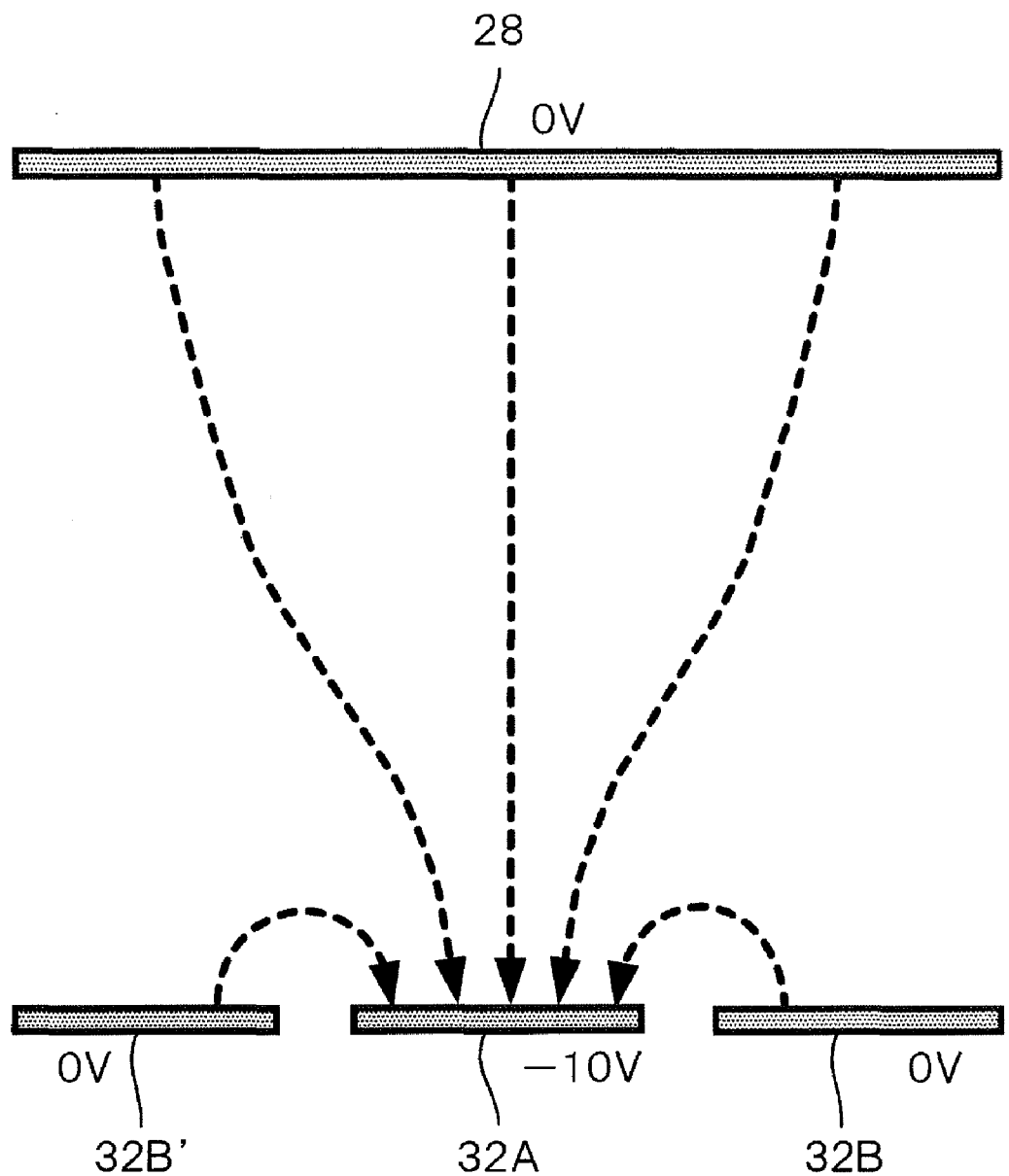
FIG. 3 is a diagram showing an example of lines of electrical force when a voltage is applied to a back-side electrode.

FIG. 3 shows results of an electric field simulation of lines of electrical force when 0V, −10V and 0V are applied to adjacent back-side electrodes 32B', 32A, and 32B. Lines of electrical force are shown in FIG. 3 by intermittent lines. A case is simulated in which the width of the back-side electrodes 32B', 32A, and 32B is 16 μm, the separation thereof is 5 μm, the separation distance between the display-side electrode 28 and the back-side electrodes 32B', 32A, and 32B is 50 μm, and the dispersion liquid 25 has a permittivity of 2. The electrophoretic particles 12 move along the lines of electrical force from the display-side electrode 28 to the back-side electrode 32A, however, when this occurs, the electrophoretic particles 12 that have moved previously, also move from the back-side electrodes 32B', and 32B towards the back-side electrode 32A.

To address this issue, the present exemplary embodiment, as described above, is provided with partitioning walls 34, 34' between the back-side electrodes 32A, 32B, and due thereto, movement of the electrophoretic particles 12 between the back-side electrodes 32A, 32B is suppressed, suppressing color mixing.

In the present exemplary embodiment, as shown in FIG. 4, 20 μm high partitioning walls 34, 34' are provided, and the due thereto, influence from the electrical potential on the adjacent back-side electrode 32 is suppressed by the partitioning walls 34, as shown by the lines of electrical force illustrated with the intermittent lines in FIG. 4, and movement of the electrophoretic particles 12 to the adjacent back-side electrode 32 is suppressed.

Note that the height of the partition walls is preferably ⅓ to ⅔ the separation distance of the substrates. When the height is lower than this, movement of the electrophoretic particles 12 between the back-side electrodes 32A, 32B cannot be suppressed. Furthermore, when the height is higher than this, the particles do not spread out on the display-side electrode 28, resulting in a decrease in contrast.

Furthermore, explanation is given in the above exemplary embodiment of a case where the migration speeds of the plural types of the electrophoretic particles 12 are each different from each other, however there is no limitation thereto, and plural types of electrophoretic particles 12 may be employed having differing respective electrical field threshold values for moving. Namely, the voltage applied between the substrates is controlled such that the electrophoretic particles 12 are moved, according to the threshold values of the electric field, to the back-side electrode 32A or the back-side electrode 32B, in sequence from the electrophoretic particles 12 with the smallest threshold value. Thereby, display of the desired color is performed in a similar manner to in the above exemplary embodiment.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to are suited to the particular use contemplated. It is intended that the scope of the invention be defined by the following claims and their equivalents.

What is claimed is:

1. A display device comprising:
   an electrophoretic display element comprising,
   a plurality of types of particles enclosed between a pair of substrates, at least one of the substrates being translucent and each of the respective plurality of types of particles being charged with the same polarity, differing in optical properties, and differing in either in migration speed and/or electric field threshold value for moving,
   a translucent display-side electrode provided at the substrate side where the translucent substrate is disposed,
   a first back-side electrode provided at the side of the other substrate, facing the display-side electrode, and
   a second back-side electrode provided at the side of the other substrate, facing the display-side electrode; and
   a voltage control section that controls the voltages applied to the display-side electrode, the first back-side electrode, and the second back-side electrode,
   wherein the plurality of types of particles includes at least three different types of electrophoretic particles,
   wherein all three different types of electrophoretic particles are charged with the same polarity, have differing optical properties and differ in either in migration speed and/or electric field threshold value for moving,
   wherein the at least three different types of electrophoretic particles comprise:
      a first type of electrophoretic particles having a fastest migration speed or a lowest threshold value for moving, from among the at least three different types of electrophoretic particles;
      a second type of electrophoretic particles having a slower migration speed or a higher threshold value for moving, than the first type of electrophoretic particles; and
      a third type of electrophoretic particles having a slower migration speed or a higher threshold value for moving, than the second type of electrophoretic particles,
   wherein the voltage control section first controls a reset state to be achieved wherein each of the three different types of electrophoretic particles are moved toward the display-side electrode, and
   wherein the voltage control section then controls the first type of electrophoretic particles and the third type of electrophoretic particles to contribute to a color of the electrophoretic display element by:
      moving the first type of electrophoretic particles toward the first back-side electrode;
      then moving the second type of electrophoretic particles toward the second back-side electrode;
      then moving the third type of electrophoretic particles toward the first back-side electrode; and
      then moving the first type of electrophoretic particles and the third type of electrophoretic particles toward the display-side electrode while the second type of electrophoretic particles remain at the second back-side electrode.

2. The display device of claim 1 further comprising a partition wall provided between the first back-side electrode and the second back-side electrode, the partition wall having a height that is shorter than the separation distance between the substrates.

3. The display device of claim 1, wherein the voltage control section controls applying a voltage to the first back-side electrode to move the first type of electrophoretic particles and the third type of electrophoretic particles toward the first back-side electrode, and wherein the voltage control section controls applying a voltage to the second back-side electrode to move the second type of electrophoretic particles remaining on the second back-side electrode toward the translucent display-side electrode, prior to completing storage of the first type of electrophoretic particles and the third type of electrophoretic particles on the first back-side electrode.

4. The display device of claim 1, wherein the voltage control section controls applying a voltage to the first back-side electrode to move the first type of electrophoretic particles remaining on the first back-side electrode, prior to completing storage of the second type of electrophoretic particles on the second back-side electrode.

5. The display device of claim 2, wherein the height of the partition wall is ⅓ to ⅔ a separation distance of the substrates.

6. The display device of claim 1, wherein all electrophoretic particles enclosed between the pair of substrates are charged with the same polarity.

* * * * *